Aug. 19, 1924.

1,505,839

J. C. WOOD

GLAREPROOF VISION SHIELD

Filed Aug. 23, 1922

John C. Wood
INVENTOR

BY Victor J. Evans
ATTORNEY

WITNESS:

Patented Aug. 19, 1924.

1,505,839

UNITED STATES PATENT OFFICE.

JOHN C. WOOD, OF CLINTON, IOWA.

GLAREPROOF VISION SHIELD.

Application filed August 23, 1922. Serial No. 583,880.

*To all whom it may concern:*

Be it known that I, JOHN C. WOOD, a citizen of the United States, residing at Clinton, in the county of Clinton and State of Iowa, have invented new and useful Improvements in Glareproof Vision Shields, of which the following is a specification.

This invention relates to vision shields, and more particularly to what I term a glare proof vision shield specially adapted for use by automobile drivers.

One of the main objects of the invention is to provide a shield of simple construction and operation which will serve to effectually protect the driver of an automobile against glare from the headlights of an approaching vehicle or from the sun. A further object is to provide a device of simple construction which may be readily produced at small cost and can be quickly and easily applied. Further objects will appear from the detailed description.

In the drawings:—

Figure 1:
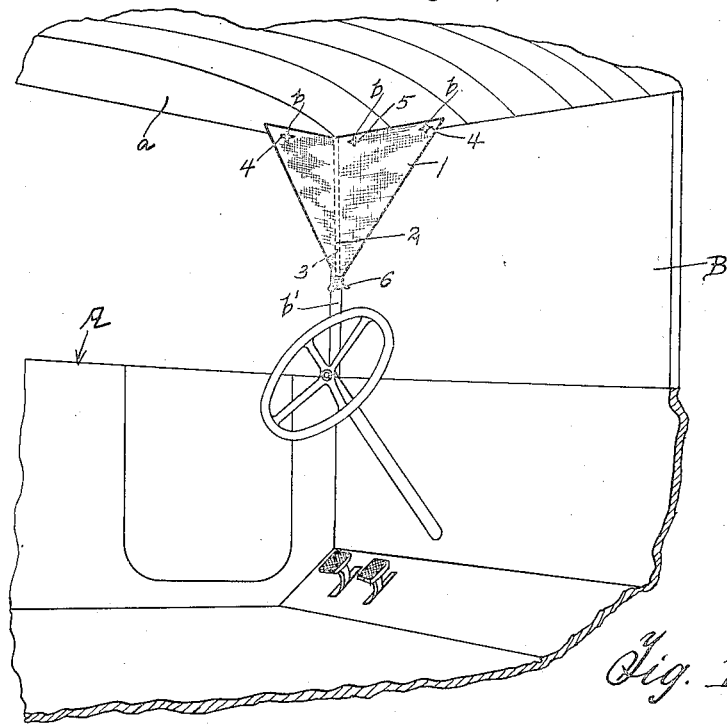
Figure 1 is a perspective view of the device as applied.
Figure 2:
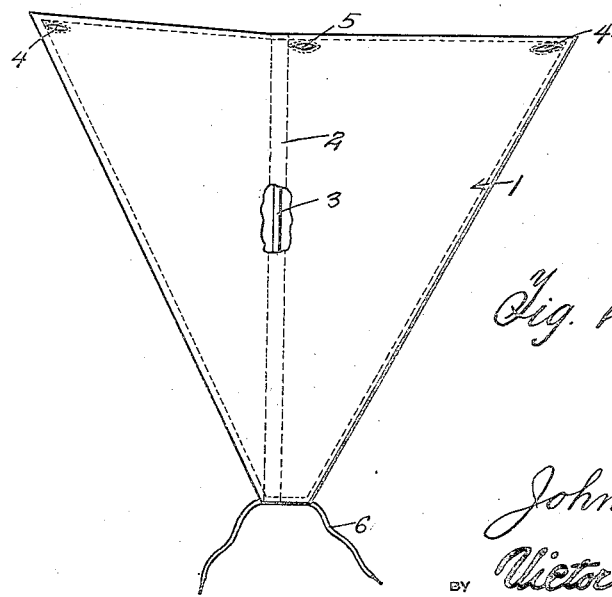
Figure 2 is a plan view of the device.

The device includes a triangular piece 1 of fabric or other suitable material which is stitched down its central portion to provide a pocket 2 within which is secured a rib 3 of wood or other suitable material. Adjacent to each corner of its broader or base portion member 1 is provided with button-holes 4, and a button-hole 5 is provided adjacent to the upper end of rib 3. A string 6, or any other suitable securing device, is secured to member 1 at the lower or apex end thereof.

In using the device the upper or base end of member 1 is secured to top $a$ of automobile A by means of fasteners $b$ which are inserted through button holes or openings 4 and 5. After the upper end of member 1 has been secured the lower end of this member is secured by string 6, or any other suitable means, such as a spring clip, to end bar $b'$ of the frame for windshield B. The fasteners $b$ are so positioned that rib 3 is disposed parallel with end bar $b'$, the member 1 being thus caused to assume a V-shape in cross-section so as to effectually shield the eyes of the driver of the automobile from the glare of the headlights of an approaching automobile or of the sun. When the device is not in use it may be readily detached from the top and the wind shield frame and folded and rolled so as to occupy but very little space, the device being then placed in any suitable place in the automobile, as between the pad and the cover of the automobile top. This device may be readily produced at small cost and can be quickly and easily applied, while it is very effective in use.

What I claim is:—

In combination with an automobile, a triangularly shaped piece of flexible material having its base secured to the side and front of the automobile top, said piece of material being provided with a rib extending from the base to the apex thereof and disposed substantially parallel with and adjacent to the end bar of the windshield of the automobile, the apex of said piece of material being secured to said end bar.

In testimony whereof I affix my signature.

JOHN C. WOOD.